(12) United States Patent
Tang

(10) Patent No.: US 9,382,983 B2
(45) Date of Patent: Jul. 5, 2016

(54) POSITIVE INFINITELY VARIABLE TRANSMISSION (P-IVT)

(71) Applicant: Duc Quang Tang, Montreal (CA)

(72) Inventor: Duc Quang Tang, Montreal (CA)

( * ) Notice: Subject to any disclaimer, the term of this patent is extended or adjusted under 35 U.S.C. 154(b) by 0 days.

(21) Appl. No.: 14/421,557

(22) PCT Filed: Aug. 13, 2013

(86) PCT No.: PCT/CA2013/050618
§ 371 (c)(1),
(2) Date: Feb. 13, 2015

(87) PCT Pub. No.: WO2014/026280
PCT Pub. Date: Feb. 20, 2014

(65) Prior Publication Data
US 2015/0240920 A1 Aug. 27, 2015

Related U.S. Application Data

(60) Provisional application No. 61/682,515, filed on Aug. 13, 2012.

(51) Int. Cl.
| F16H 47/06 | (2006.01) |
| F16H 15/50 | (2006.01) |
| F16H 15/48 | (2006.01) |
| F16H 61/662 | (2006.01) |
| F16H 3/76 | (2006.01) |
| F16H 61/66 | (2006.01) |
| F16H 61/664 | (2006.01) |

(52) U.S. Cl.
CPC ............... *F16H 15/48* (2013.01); *F16H 3/76* (2013.01); *F16H 15/50* (2013.01); *F16H 61/66* (2013.01); *F16H 61/664* (2013.01); *F16H 61/66272* (2013.01)

(58) Field of Classification Search
CPC .......... F16H 47/04; B60K 6/445; B60K 6/12
USPC ............. 74/5, 72, 73, 115; 475/5, 72, 73, 115
See application file for complete search history.

(56) References Cited

U.S. PATENT DOCUMENTS

| 6,203,463 | B1 * | 3/2001 | Casey | F16H 47/04 457/72 |
| 7,335,123 | B2 * | 2/2008 | Morscheck | B60K 6/12 475/5 |
| 7,722,493 | B2 * | 5/2010 | Liebherr | F16H 47/05 475/115 |
| 7,972,236 | B2 * | 7/2011 | Hiraki | B60K 6/445 475/286 |
| 2003/0008745 | A1 | 1/2003 | Heindl | |
| 2010/0323837 | A1 | 12/2010 | Rosemeier et al. | |

FOREIGN PATENT DOCUMENTS

ES 2016129 A6 10/1990

OTHER PUBLICATIONS

International Search Report and Written Opinion for Application No. PCT/CA2013/050618 dated Nov. 15, 2013.

* cited by examiner

*Primary Examiner* — Ha D Ho
(74) *Attorney, Agent, or Firm* — Lerner, David, Littenberg, Krumholz & Mentlik, LLP

(57) ABSTRACT

A transmission comprising a reactor and an activator is disclosed. The reactor is a differential system, used to transmit power between two drive shafts. The disclosed reactor comprises three gearsets comprising non-intersecting and non-parallel gears arranged so that they can be coupled together. The gear ratios and the dimensions of the three gearsets are selected such that the two drive shafts can rotate at any speed ratio. The activator controls the strength and direction of the torques applied to the two drive shafts and enables the transfer of a series of torques through all the gearsets. The strengths and directions of the torques applied on the two drive shafts are controlled through the pressure control unit and the switching valve.

13 Claims, 15 Drawing Sheets

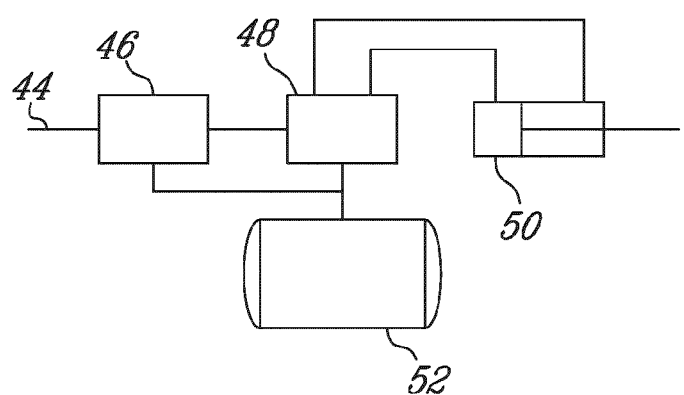
Fig-5A
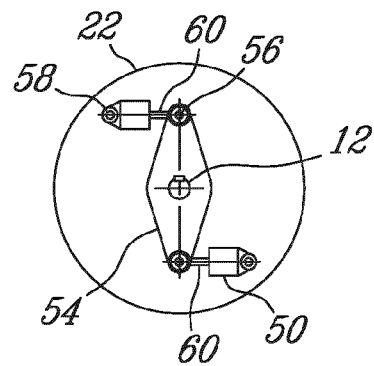
Fig-5B
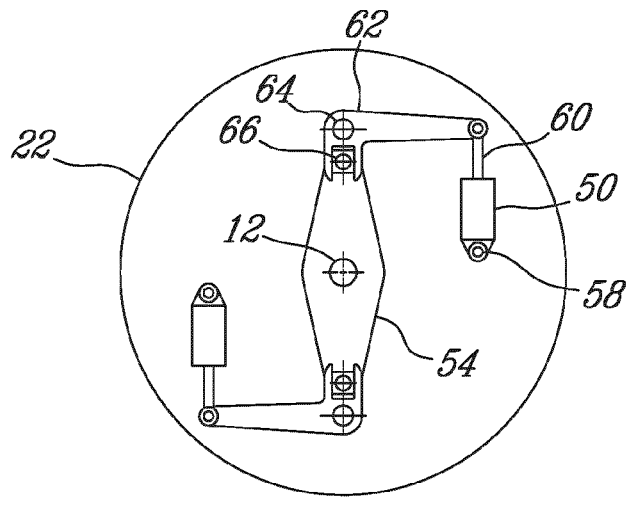
Fig-5C
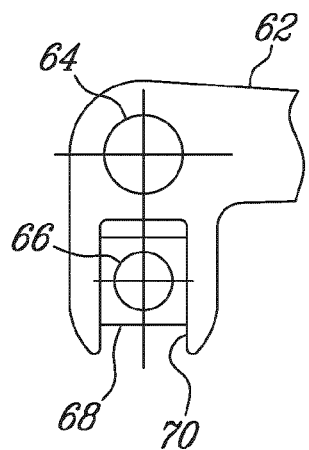

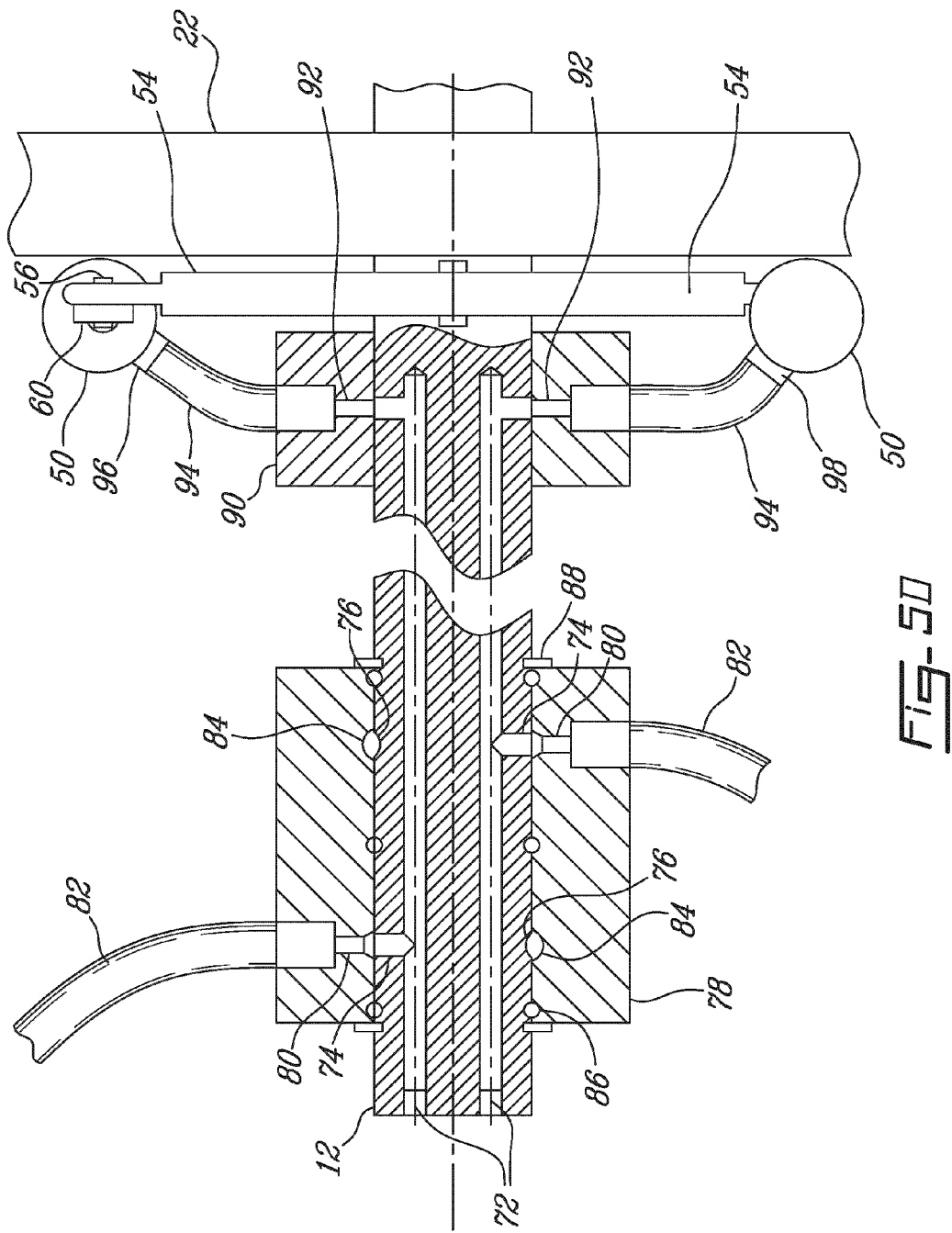

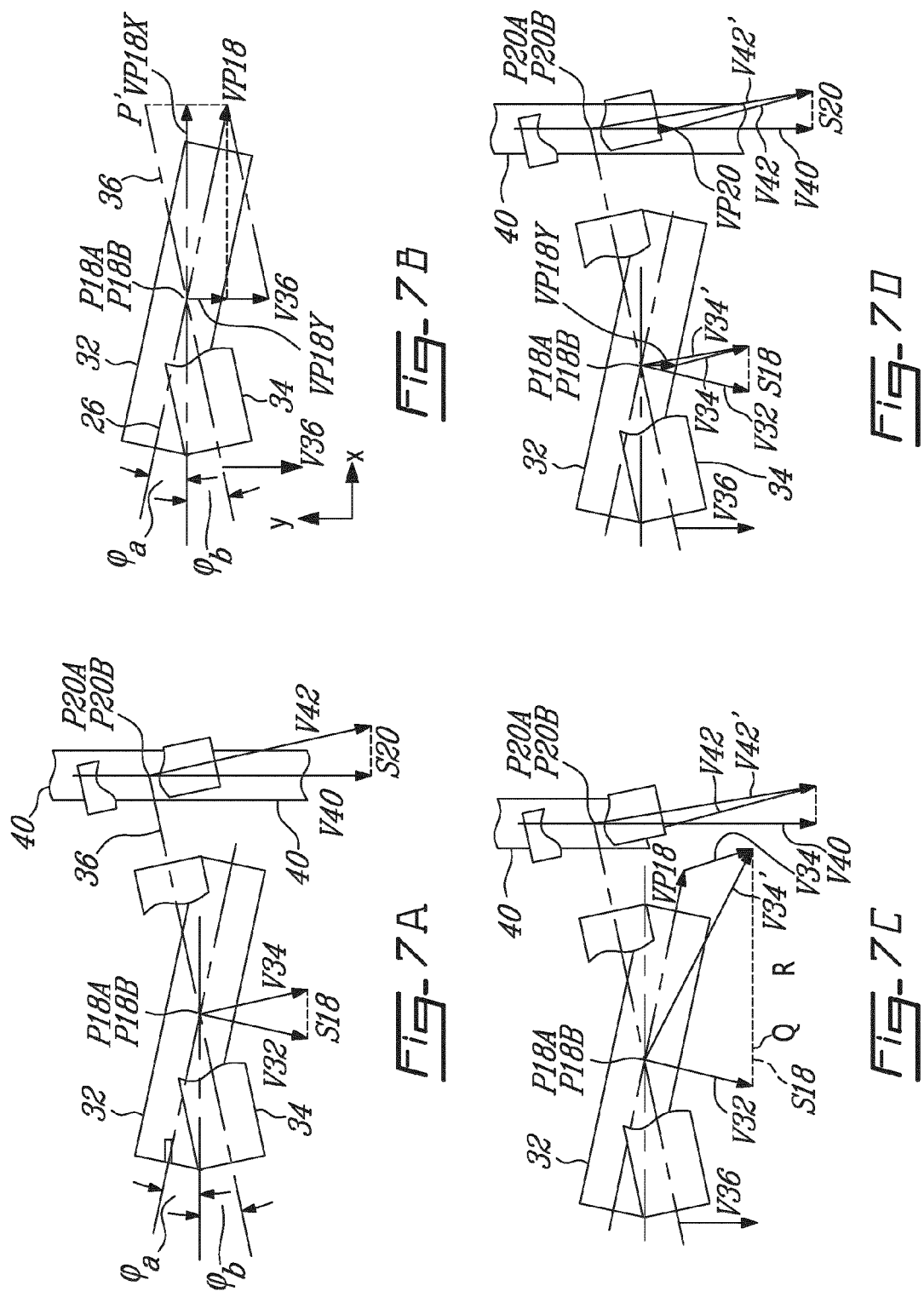

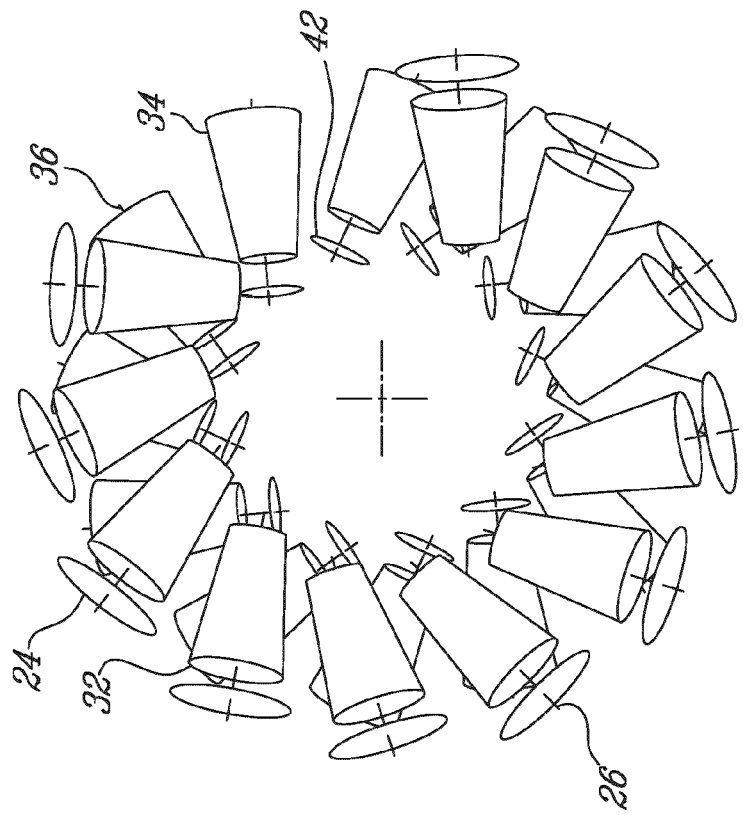
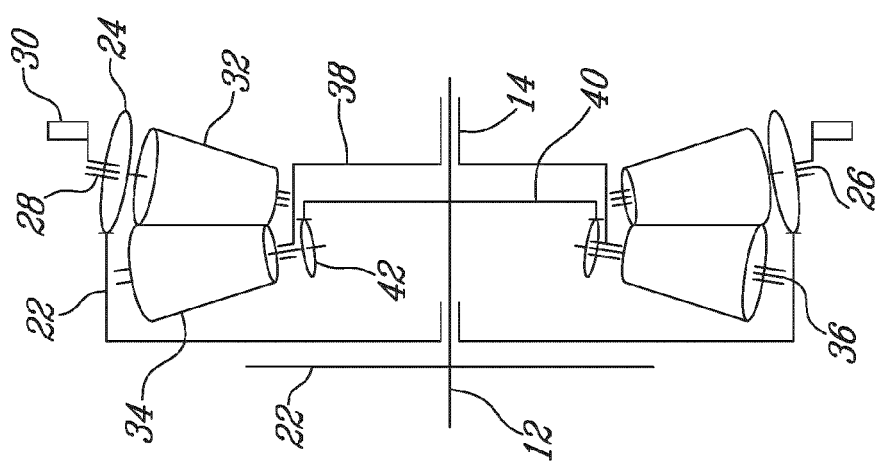

POSITIVE INFINITELY VARIABLE TRANSMISSION (P-IVT)

CROSS REFERENCE TO RELATED APPLICATIONS

The present application is a national phase entry under 35 U.S.C. §371 of International Application No. PCT/CA2013/050618, filed Aug. 13, 2013, published in English, which claims priority from U.S. Provisional Application No. 61/682,515 filed on Aug. 13, 2012, all of which are hereby incorporated herein by reference.

FIELD OF THE INVENTION

The present invention relates to a positive infinitely variable transmission (P-IVT). In particular, the present invention relates to a positive continuously variable transmission (CVT) typically for use within both automobiles and stationary machines. More particularly, the present invention relates to positive engagement CVT, the CVT using positively engaged members, such as gear teeth, to transmit power.

BACKGROUND OF THE INVENTION

Continuously Variable Transmission (CVT) provide a variable speed ratio to maintain an optimal match between the power demand and engine speed, which improves engine efficiency, thereby reducing the fuel consumption and gas emissions.

The most common forms of CVT in use today are V-Belt CVTs. V-Belt CVTs are frictional drives that transmit power through fictional forces. They require large effective radiuses, high belt/pulleys clamping pressure and special transmission fluids in order to provide for sufficient driving torque and to prevent severe wear. During operation, the slippages between the belt and the sheaves under high clamping pressure cause wear and power loss. These characteristics induce to the limitations on torque capacity and transmission efficiency and thus prevent V-belt CVT from being used on vehicles with large displacement engines.

V-Belt CVTs provide a variable speed ratio within a finite range. Additionally, an automobile transmission with V-Belt CVT needs a start-up clutch and a drive- and reverse gearing unit.

To overcome the limitations inherent in the frictional CVTs, attention has been turned to the Positive Engagement, Continuously Variable Transmission (PECVT). To vary the speed ratio, PECVTs vary at least one effective radius. That induces to a meshing problem referred to as the non-integer tooth problem.

Nearly all the published PECVTs, when solving the non-integer tooth problem, become too complex or incompetent or develop another problem known as oscillating output problem. The oscillating output induces to fatigue failure.

U.S. Pat. Nos. 4,235,125, 4,327,604 and 6,053,840 disclose several embodiments comprising two drive shafts and a number of gear-sets including two planetary gear sets (epicyclic gear). The gearsets are coupled together to form a differential system.

The advantage of the embodiments is that they provide a smooth and quiet positive engagement suitable for high torque applications. However, the embodiments do not have any facility to control the speed ratio between the two drive shafts or the torques applied on the shafts. As a result they are unable to control over when and how fast the speed ratio changes.

OBJECTS OF THE INVENTION

The object of the invention is to provide a positive engagement continuously variable transmission able to handle high torque and power, and function at any speed ratio, from infinity to zero, same direction or opposite direction.

Other objects, advantages and features of the present invention will become more apparent upon reading of the following non-restrictive description of specific embodiments thereof, given by way of example only with reference to the accompanying drawings.

SUMMARY OF THE INVENTION

In order to address the limitations of the prior art and other considerations there is provided a positive infinitely variable transmission (P-IVT). The P-IVT comprises a first driveshaft, a second driveshaft, a first gear rotating about a central axis and secured to the first driveshaft for rotation therewith, a plurality of fixed second gears equally spaced about the central axis and in meshing contact with the first gear, a plurality of fixed third gears spaced regularly about the central axis, wherein each of the plurality of third gears rotates with a respective one of the plurality of fixed second gears, a plurality of fourth gears each mounted on a rotatable carrier and spaced regularly about the central axis, the carrier rotatable about the central axis, wherein the second driveshaft rotates with the rotatable carrier and further wherein the plurality of third gears is in meshing contact with the plurality of fourth gears, a plurality of fifth gears equally spaced about the central axis, each of the fifth gears rotating with a respective one of the plurality of fourth gears, a sixth gear rotating about the central axis and controllably secured to the first driveshaft for rotation therewith, the sixth gear in meshing contact with each of the fifth gears, and an actuator for controllably adjusting an angle of rotation at which the sixth gear is attached to the first drive shaft, thereby enabling the transfer of a series of torques through all the gears.

There is also provide a planetary gearset. The gearset comprises a first plurality of gears each mounted on a respective one of a first plurality of auxiliary shafts supported by a first stationary carrier and spaced regularly about a central axis and a second plurality of gears each mounted on a respective one of a second plurality of auxiliary shafts supported by a second carrier and spaced regularly about the central axis, the second carrier rotatable about the central axis, wherein the second plurality of gears mesh with and rotate within the first plurality of gears, said first plurality of gears thereby functioning as a ring gear and said second plurality of gears functioning as planetary gears.

Also, there is provided a variable transmission for transferring motive energy between a source of power and a load. The transmission comprises a torque generation and transfer mechanism comprising an input and an output, an input drive shaft between the source of power and the input and an output drive shaft attached between the output and the load. The torque generation and transfer mechanism generates a torque a first portion of which is transferred to the input drive shaft and a second portion of which is transferred to the output drive shaft.

To avoid the non-integer tooth problem, the P-IVT of the present invention does not vary any effective radius. Rather, instead of varying at least one effective radius and thus achieve a desired speed ratio, as all other mechanical CVTs and PECVTs do, the P-IVT of the present invention achieves the desired speed ratio through controlling the strengths and directions of torques applied to the drive members.

The P-IVT of the present invention comprises a torque transfer mechanism comprising a reactor and an activator.

The reactor is a mechanical assembly. More specifically, the reactor is a differential system, used to transmit power between the P-IVT's two drive shafts. A typical reactor comprises two drive shafts, a fixed gearset and two planetary gearsets. These three gearsets are non-intersecting and non-parallel gears and specifically arranged so that they can be coupled together, in that the output of the fixed gearset is connected to the input of the first planetary gearset; the output of the first planetary gearset is connected to the input of the second planetary gearset. The gear ratios and the dimensions of the three gearsets are selected such that the two drive shafts can rotate at any speed ratio.

A typical activator includes a hydraulic pressure source, a pressure control unit, a switching valve and double-acting hydraulic-cylinders. The hydraulic cylinders are positioned between the output of the second planetary gearset and the input of the fixed gearset, connecting them together.

The activator is used to control the strength and direction of the torques applied to the two drive shafts by enabling the transfer of a series of torques through all the gearsets. As the torques transfer through the gearsets, they result in the torques being applied onto the two drive shafts. The strengths and directions of the torques applied on the two drive shafts are controlled through the pressure control unit and the switching valve.

The above method of operation allows the P-IVT to overcome the problem of oscillating output, thereby providing for a smoother and quieter drive. The P-IVT can operate at any speed ratio and allow the speed ratio to be rapidly varied. When incorporated within a vehicle, for example, the P-IVT can be used to connect the engine and the differential while requiring neither a start-up clutch nor a drive-reverse gearing. In operation, the P-IVT allows the engine to speed up very rapidly with a large variation range (from idle to max power speed), helps in improving driving performance and/or reducing the power capacity design of the engine, improving the engines thermal efficiency. Since the engine can rapidly speed up, when the vehicle is cruising, for example, the engine can be allowed to function close to the optimum efficient speed to supply required power, or drop to idle speed when power is no longer needed.

The above provides vehicles equipped with P-IVT advantages in terms of production cost, weight, gas mileages and driving performance in comparison to vehicles with traditional automatic transmissions and CVT based transmissions.

BRIEF DESCRIPTION OF THE DRAWINGS

In the appended drawings:

FIG. 5A provides a schematic diagram of a hydrostatic activator in accordance with an illustrative embodiment of the present invention;

FIGS. 5B and 5C provide front plan views of activators in accordance with illustrative embodiments of the present invention;

FIG. 5D provides a detailed partial cut-away view of a first drive shaft and activator accordance with illustrative embodiments of the present invention;

FIGS. 7A through 7H provide vector diagrams of the interaction of two planetary gearsets in accordance with an illustrative embodiment of the present invention;

FIGS. 9A and 9B provide respectively side and front perspective views of a reactor in accordance with an alternative configuration in accordance with an illustrative embodiment of the present invention;

DESCRIPTION OF ILLUSTRATIVE EMBODIMENTS

Figure 1:
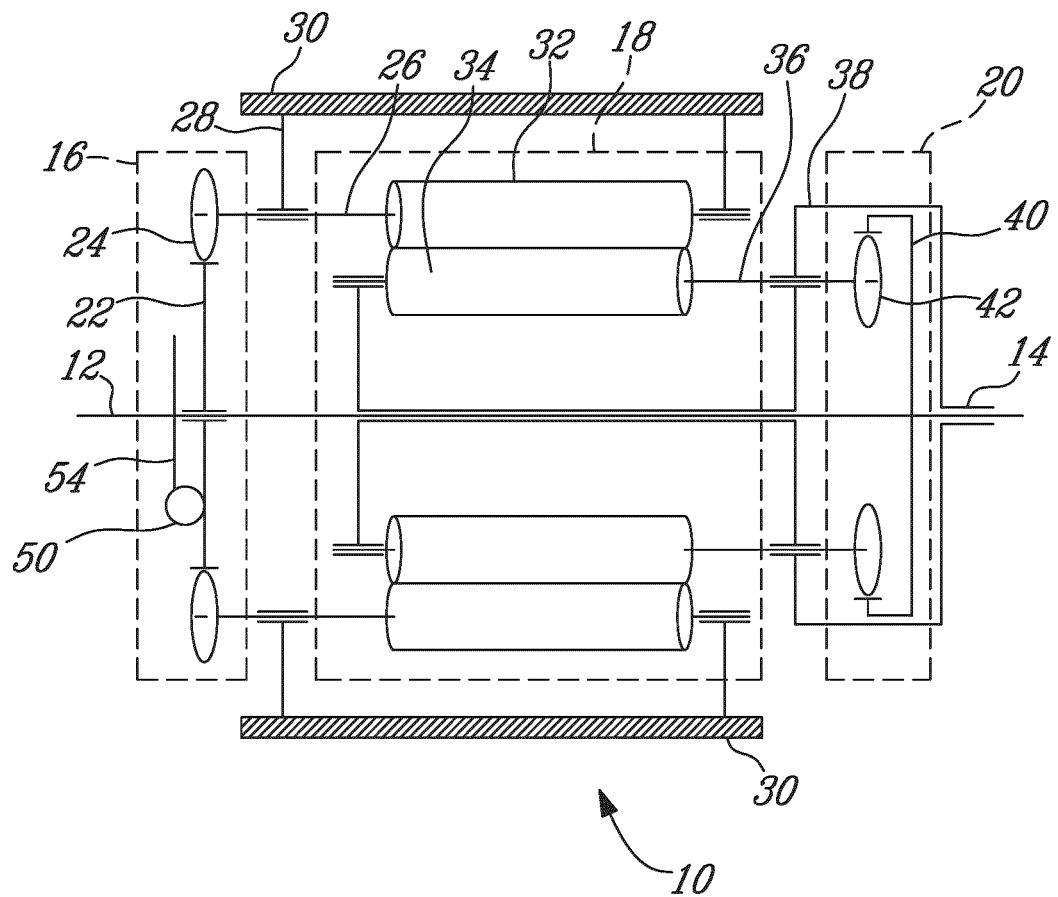
FIG. 1 provides a side plan view of a reactor in accordance with an illustrative embodiment of the present invention.

Referring now to FIG. 1, a P-IVT in accordance with an illustrative embodiment of the present invention and generally referred to by the reference numeral 10, will now be described. The P-IVT 10 comprises a torque transfer mechanism comprising two parts: a mechanical assembly referred to herein as a reactor and a hydrostatic or electrical module referred to as an activator.

The present invention is illustrated in further detail by the following non-limiting examples.

Referring to FIG. 1, the reactor comprises a first (input) drive shaft 12 and a second (output) drive shaft 14, a fixed gearset 16, a first planetary gearset 18 and a second planetary gearset 20. The fixed gearset 16 comprises a first gear 22 meshing with a plurality of second gears 24. The first gear 22 is mounted freely on the first drive shaft 12. Each of the plurality of second gears 24 is mounted on one of a first plurality of auxiliary shafts as in 26. The first plurality of auxiliary shafts 26 are arranged around the central axis and supported on a first carrier 28 that is illustratively secured on a transmission case 30.

Still referring to FIG. 1, the first planetary gear-set 18 comprises a plurality of long hyperboloid third gears 32 meshing with a plurality of long hyperboloid fourth gears 34. Each of the third gears 32 is mounted on one of the first plurality of auxiliary shafts as in 26 and connects to a respective one of the second gears 24. Each of the fourth gears 34 is mounted on one of a second plurality of auxiliary shafts as in 36. The second plurality of auxiliary shafts as in 36 are arranged around the central axis and supported on a second carrier 38. As will now be apparent to a person of ordinary skill in the art, the second carrier 38 is mounted freely on the first drive shaft 12 and is secured to the second drive shaft 14 such that it rotates therewith.

Still referring to FIG. 1, the second planetary gear-set 20 comprises a sixth gear 40 meshing with a plurality of fifth gears 42. The sixth gear 40 is splined/keyed to the first drive shaft 12 such that it rotates therewith. Each of the fifth gears as in 42 is mounted on a respective one of the second plurality of auxiliary shafts as in 36, and is thus rotatably connected to a respective one of the second plurality of gears 36.

Still referring to FIG. 1, in a particular alternative embodiment with appropriate modifications, the first drive shaft 12 could be fixed and the first carrier 28 rotatable about the central axis and driven by an input, for example by attaching the first carrier 28 to the flywheel an engine or the like (not shown).

Figure 2:
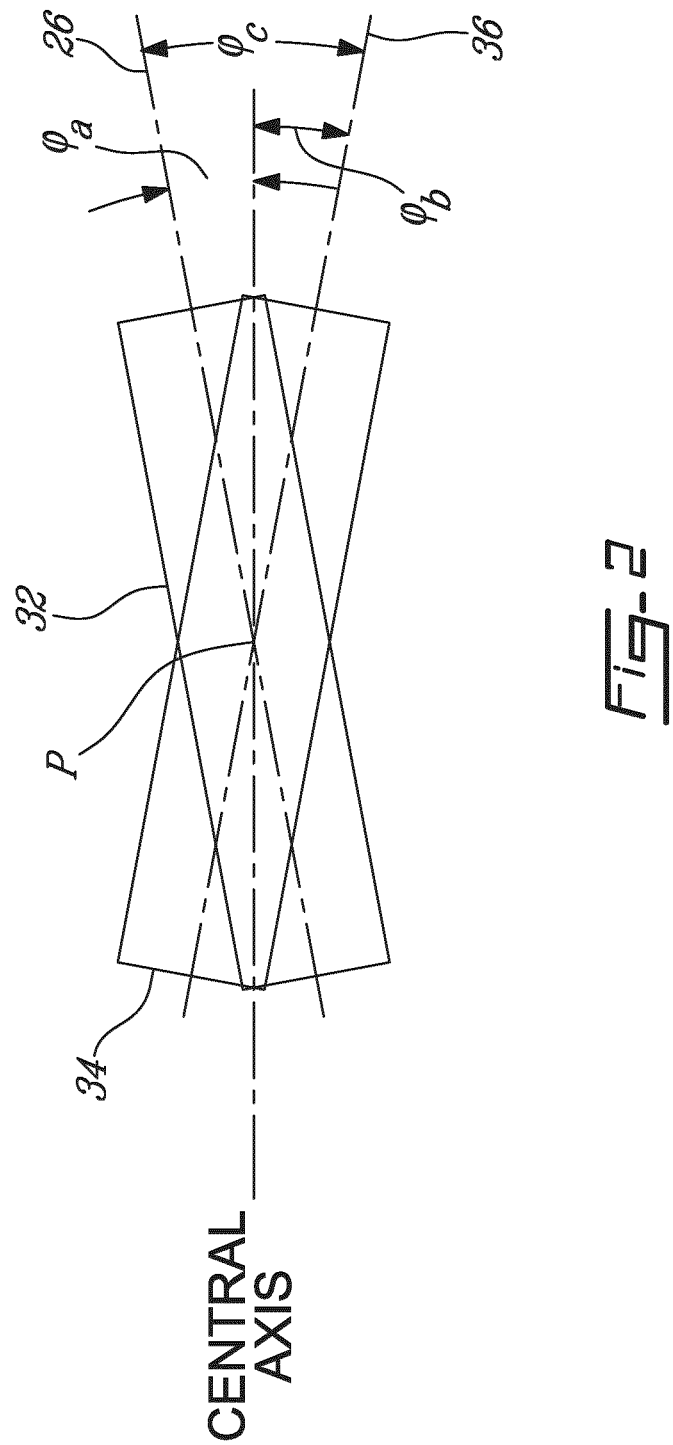
FIG. 2 provides a top detailed view of a pair of gears in accordance with an illustrative embodiment of the present invention.

Referring to FIG. 2 in addition to FIG. 1, in an exemplary embodiment the axes of one of the first plurality of auxiliary shafts as in 26 and one of the second plurality of auxiliary shafts as in 36 are non-parallel and non-intersecting to each other. Rather, the shafts 26, 36 form an angle $\phi_c$ referred to as the crossed-angle. They also form angles $\phi_a$ and $\phi_b$ with the central axis. These three gearsets may be classified as crossed-helical gears, that is one type of nonintersecting and non-parallel gear.

Figure 3A:
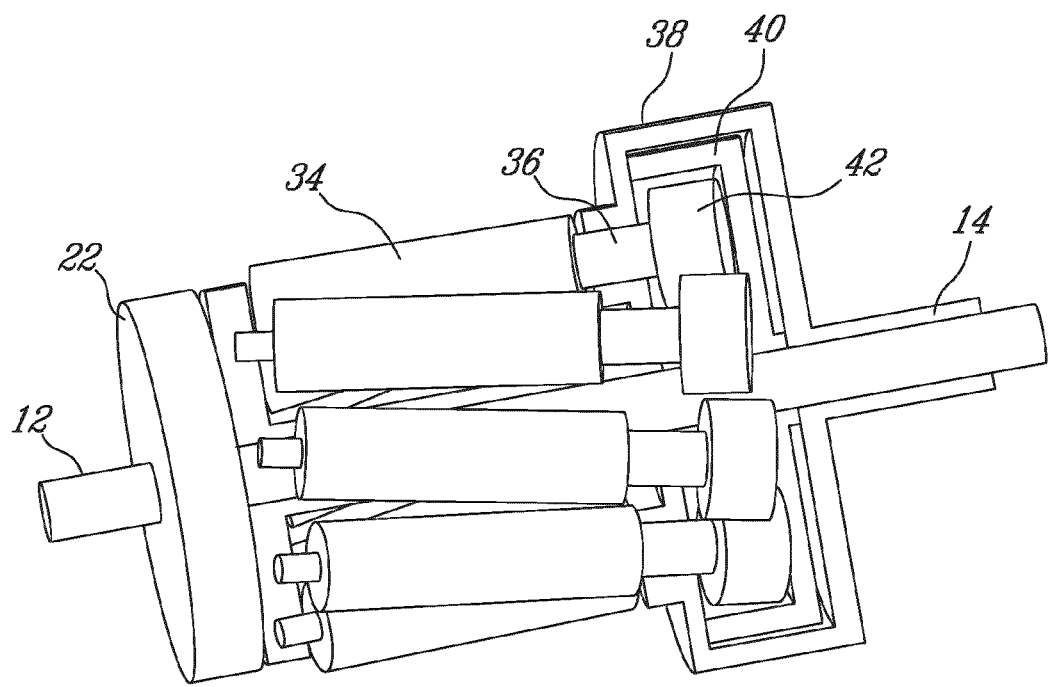
FIGS. 3A and 3B provide respectively a detailed side perspective view and a side perspective view of a reactor in accordance with an illustrative embodiment of the present invention.
Figure 3B:
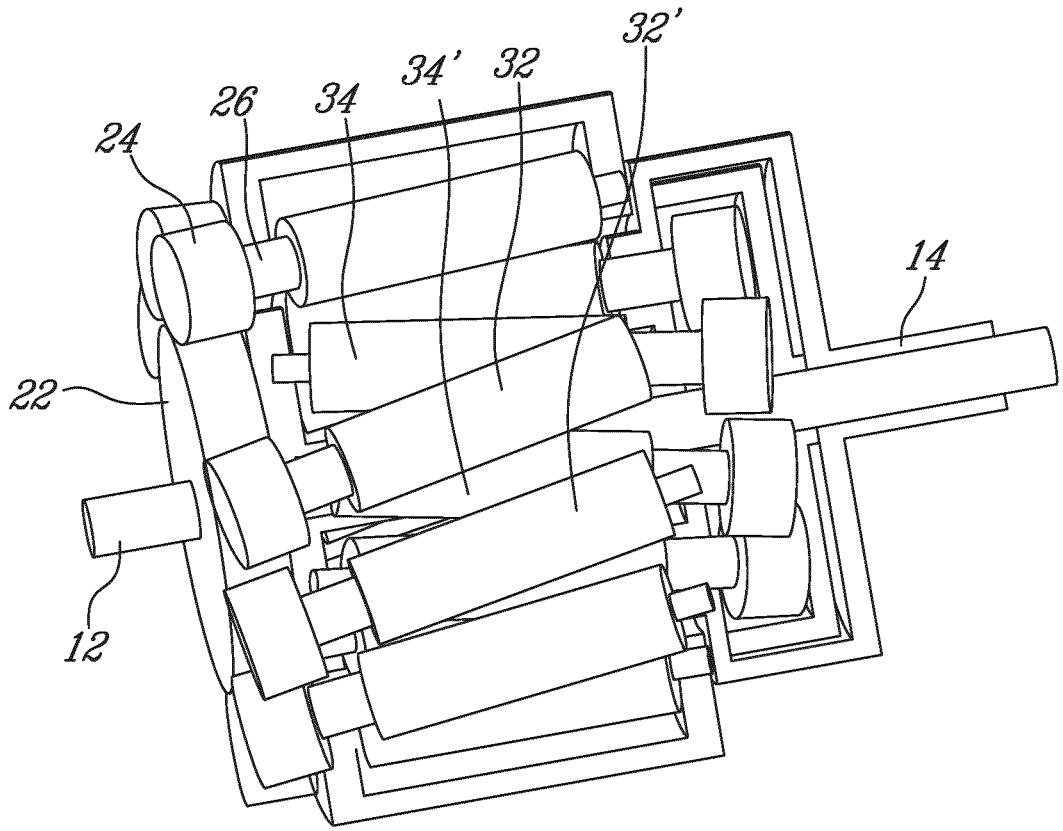

Referring now to FIGS. 3A and 3B, the arrangements of the gearsets are shows in 3-D. For clarity, the gears of the gearsets are conveniently shown with a cylindrical shape. In FIG. 3A, the second gears 24, third gears 32 and the first carrier 28 have been removed to render visible the inner parts. FIG. 3B shows all the main components of the reactor.

Figure 3C:
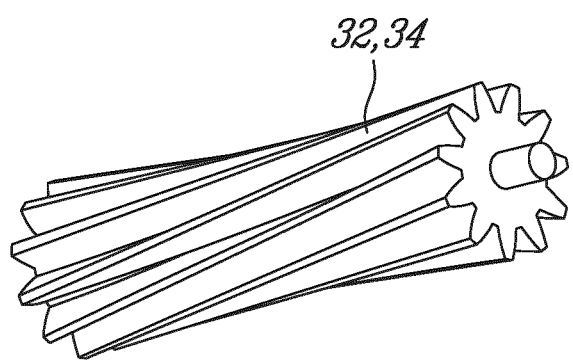
FIG. 3C provides perspective views of a hyperboloid gear in accordance with an illustrative embodiment of the present invention.

Referring to FIG. 3C, an exemplary embodiment of a third gear or fourth gear as in 32, 34 in 3-D is provided. Referring back to FIG. 2 in addition to FIG. 3C, as the axes of the auxiliary shafts 26, 36 are nonparallel and nonintersecting to the central axis, the distances from the axes to the central axis vary along the axes. For smooth engagement, the shapes of the gears are not uniformly cylindrical, but rather hyperboloid (i.e. their pitch diameter at the middle is slightly smaller than their pitch diameter at both ends).

Figure 4:
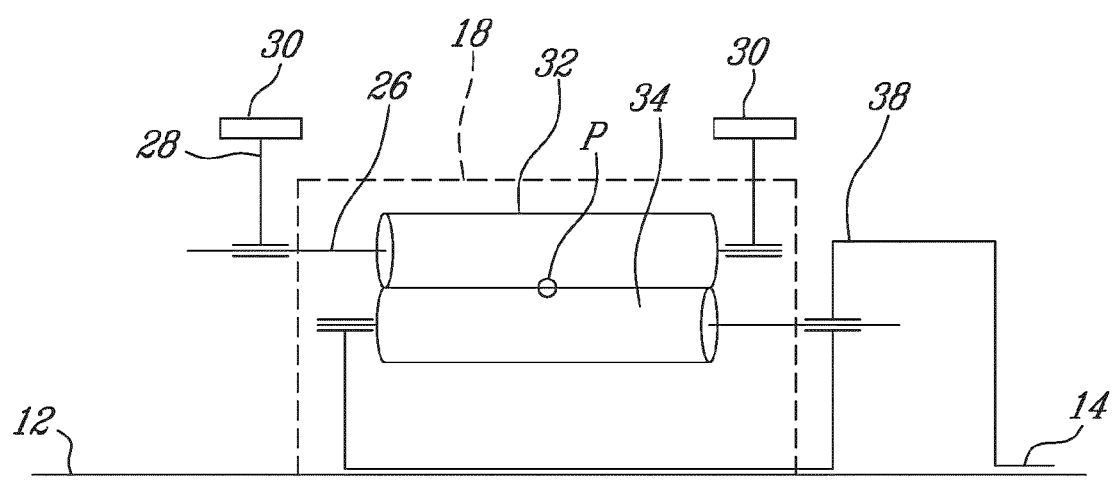
FIG. 4 provides a schematic diagram of a first planetary gearset of a reactor in accordance with an illustrative embodiment of the present invention.

Referring to FIG. 4 in addition to FIG. 2, the first planetary gearset 18 is detailed. The gearset 18 comprises three rotatable members and one stationary member. The three rotatable members comprise the third gears as in 32 and the fourth gears as in 34 and the rotatable carrier 38. The stationary member is the first carrier 28. As will now be apparent to a person of ordinary skill in the art, application of rotational forces to the first drive shaft 12 imparts a rotational force to each of the third gears 32 which in turn impart rotational forces to the fourth gears as in 34, either individually, causing them to rotate about their own axis, or as an assembly thereby causing the rotatable carrier 38, and therefore the second drive shaft 14, to rotate.

Still referring to FIG. 2 and FIG. 4, the third gears 32 and fourth gears 34 are shown with their pitch surfaces illustrated as long cylinder shapes. During meshing, the pitch surface of a first of the third gears 32 contacts the pitch surface of a second of the fourth gears 34 at a point 'P', referred to as the contact-point, which moves along the length of the third gears 32 and the fourth gears 34 as they are engaged and disengaged during rotation.

Still referring to FIG. 2 and FIG. 4, the third gears 32 and the fourth gears 34 engage each other through a narrow zone referred to hereinafter as the contact-zone. As discussed above, the fourth gears as in 34 can have two movements: individual rotation about their own axis and rotation together as an assembly about the central axis. As the second drive shaft 14 rotates, the fourth gears as in 34 rotate around the central axis and the contact-zone (and the contact point P) moves. Indeed, each of the fourth gears as in 34 commences meshing with a given one of the third gears as in 32 at a first end and disengages the third gear 32 as the contact-zone reaches the second opposite end. Similarly, each of the third gears as in 32 commences meshing with a given one of the fourth gears as in 34 at a first end and disengages the fourth gear 34 as the contact-zone reaches the opposite second end.

Still referring to FIG. 2 and FIG. 4, in order to provide for continuous meshing/engagement, the crossed-angle $\phi_c$, the length and number of third gears as in 32 and fourth gears as in 34 should be sufficient to ensure that a gear of the third gears as in 32 always meshes with at least one gear of the fourth gears as in 34, and vice versa. As illustrated on FIG. 3B, prior to a fourth gear 34 leaving a third gear 32, it is engaged by an adjacent one of the third gears 32' and the following fourth gear 34' is engaged by the third gear 32. For smooth engagement, the angles $\phi_a$ and $\phi_b$, the shape, size and positions of the third gears as in 32 and the fourth gears as in 34 need to be suitably designed. In other words, to provide for continuous engagement, together the third gears as in 32 together form a first ring gear (referred to herein as an imaginary gear X) that engages all of the fourth gears as in 34 without interruption. Similarly, together the fourth gears as in 34 together form a second ring gear (imaginary gear Y) that engages all of the third gears as in 32 without interruption.

Activator

Referring now to FIG. 5A, a hydrostatic activator is illustrated. The hydrostatic activator includes a hydraulic pressure source 44, a pressure control unit 46, a switching valve 48, a number of double-acting (bi-directional) hydraulic-cylinder assemblies 50, a reservoir 52 and required tubing. The pressure control unit 46 is illustratively able to provide hydraulic pressure variable from zero to a desired pressure. The switching valve 48 is used to direct the fluid from the pressure control unit 46 to a selected one of the two ports at each double-acting hydraulic-cylinder assembly 50 and directs the fluid from the other port to reservoir 52.

Referring to FIG. 5B, the hydraulic cylinder assemblies as in 50 are provided to moveably interconnect the first drive shaft 12 to the first gear 22. In this regard an arm 54 is splined or otherwise secured to the first drive shaft 12 for rotation therewith and the hydraulic cylinder assemblies as in 50 positioned between respective first pivot points 56 at each end of the arm 54 and second pivot points 58 on the first gear 22. As will now be apparent to a person of ordinary skill in the art, appropriate application of hydraulic pressure to the hydraulic cylinder assemblies as in 50 causes the pistons as in 60 to be extended or retracted, thereby adjusting the angular positioning of the first gear 22 relative to the first drive shaft 12.

Referring to FIG. 5C, in an alternative embodiment, the activator additional includes levers as in 62 to reduce the forces needed at the hydraulic cylinders. As shown, each lever as in 62 is pivotally mounted on to the first gear 22 via a pivot 64. Each lever as in 62 is attached at a first end to a respective end of the arm 54 via a sliding pivot 66 and secured at a second end to a respective hydraulic cylinder assembly as in 50. As discussed above, appropriate application of hydraulic pressure to the hydraulic cylinder assemblies as in 50 causes the pistons as in 60 to be extended or retracted, thereby adjusting the angular positioning of the first gear 22 relative to the first drive shaft 12.

Still referring to FIG. 5C, and as shown more clearly on the detailed view, the sliding pivot 66 is enclosed by a bushing 68 that illustratively has a rectangular outer shape. The bushing 68 is slideably mounted in a slot 70 in the lever 62, while still allowing the lever 62 to rotate about the pivot 64. A person of ordinary skill in the art will now understand that the levers as in 62 may have other configurations in relation to their shape. For example, the levers as in 62 can be the straight bars or have different bending angles. The activator may have other configurations by modifying the positions of the levers and the hydraulic cylinders or switching the position of the pivots.

Referring to FIG. 5D in addition to FIG. 5A, in order to provide a passage via which the hydraulic fluid can flow between the hydraulic cylinders 50 and the switching control valve 48, a pair of conduits as in 72 are machined or otherwise formed within and along the length of the first drive shaft 12. A pair of radial shaft bores as in 74 are machined or otherwise formed perpendicular to the central axis of the first drive shaft 12, each of the shaft bores as in 74 intersecting with a respective one of the conduits as in 72. Additionally, a pair of shaft grooves as in 76 are machined or otherwise formed in the circumference of the first drive shaft 12, each of the shaft grooves as in 76 intersecting with a respective one of the shaft bores as in 74. A collar 78 is placed about the first drive shaft 12. In this regard, the collar 78 is fixed and the first drive shaft 12 free to rotate relative to the collar 78 (typically on a bearing or bushing or the like, not shown). The collar 78 includes a pair of collar bores as in 80, each of the collar bores 80 positioned such that it intersects which a respective one of the shaft grooves as in 76. The ends of a pair of hydraulic hoses as in 82 are secured in respective ones of the collar bores 80 by a thread or the like (not shown) such that hydraulic fluid may pass via the end of the hose 82 into a respective conduit 72 and vice versa. A pair of collar grooves as in 84 may also be machined on the inside of the collar 78 such that they are positioned opposite a respective one of the shaft grooves as in 76 in order to improve flow of hydraulic fluid. O-rings as in 86 are provided to ensure that the hydraulic fluid is retained within the collar 78. Retainer rings (such as C clips or the like) as in 88 can be provided to ensure that the collar 78 does not migrate along the length of the first drive shaft 12.

Still referring to FIG. 5D, a second collar 90 is secured to the first drive shaft 12 for rotation therewith and a pair of radial bores as in 92 are provided through the second collar 90 and the first drive shaft 12, each of the radial bores as in 92 intersecting with a respective one of the conduits as in 72. A second pair of hydraulic hoses as in 94 is provided between each of the radial bores as in 92 and a respective input connector 96 or return connector 98 on the hydraulic cylinder assemblies as in 50. Of note is that for each hydraulic cylinder assembly as in 50 as illustrated respectively only the supply connector 96 or the return connector 98 and respective hydraulic hose as in 94 is shown, although a person of ordinary skill in the art will understand that each hydraulic cylinder assembly as in 50 will require both a supply connector 96 and a return connector 98 and their respective hoses. As discussed above, a first end of each of the hydraulic cylinder assembly as in 50 is mounted to the first gear as in 22 via a pivot or the like (not shown) while a second (for example, the end of the piston 60) is secured to a pivot point 56 towards the end of the arm 54. Using the above supply assembly, hydraulic fluid under pressure can be selectively delivered to either the input connector 96 or return connector 98 of each of the hydraulic cylinder assemblies as in 50, thereby causing the pistons as in 60 to selectively extend or retract and thereby selectively increasing or decreasing a relative angle of the first gear 22 to the first drive shaft 12.

In an alternative embodiment (not shown), the hydraulic cylinders may be positioned between the sixth gear 40 and the first drive shaft 12. In this regard, each hydraulic cylinder assembly as in 50 has one end pivotally mounting on the sixth gear 40 and the other end pivotally mounting on an arm that is splined/keyed to first drive shaft 12. The sixth gear 40, instead of being splined to the first drive shaft 12, it is mounted freely while the first gear 22 is splined to the first drive shaft 12.

Selection of Speed Ratio

Referring back to FIG. 1, to function over an unlimited range of speed ratios, the reactor takes advantage of a gear ratio design that allows the first drive shaft 12 to rotate while the second drive shaft 14 remains stationary and vice versa. In order to provision for the first drive shaft 12 being able to rotate while the second drive shaft 14 remains stationary, the gear ratio G_16 of the fixed gearset 16 is equal to the gear ratio G_20 of the second planetary gearset 20 while the gear ratio G_18 of the first planetary gearset 18 is 1:1. The gear ratios of the reactor are defined by the following equations:

$$G\_16 = G\_20 \tag{1}$$

$$G\_18 = 1:1 \tag{2}$$

With reference to the non-parallel and non-intersecting gearset, the gear ratio is determined by the ratio between the pitch diameters of the gears and also on the helix angles of the gears. By varying the helix angles, the numbers of teeth of the gears may be varied and as a result, the gear ratio. This feature allows providing a gear ratio G_16 equal to G_20 even if the ratio between the pitch diameters of the first gear 22 and the plurality of second gears as in 24 is different from the ratio between the pitch diameters of the sixth gear 40 and the fifth gears 42.

In a particular embodiment the (relative) number of teeth for each gear in the various gearsets can be determined. For example, in order to have unity in the first planetary gearset 18, the number of teeth on the third gears as in 32 should be the same as that of the fourth gears as in 34. Similarly, as the ration of the fixed gearset 16 should match that of the second planetary gearset, the ratio between the number of on the first gear 22 and each of the plurality of second gears 24 should match the ratio between the number of teeth on the sixth gear 40 and one of the fifth gears 42.

$$N\_32 = N\_34 \tag{3}$$

$$N\_22/N\_24 = N\_40/N\text{-}42 \tag{4}$$

With a non-parallel and non-intersecting gearset, the gear ratio is dependent not only on the ratio between the pitch diameters of the gears, but also the helix angles of the gears. By varying the helix angles, it is possible to vary the number of teeth of the gears and thus vary the gear ratio. This feature allows provision of a gear ratio G_16 equal to G_20 even if the ratio between the pitch diameters of the first gear 22 and the plurality of second gears 24 is different from the ratio between the pitch diameters of the sixth gear 40 and the fifth gears 42.

The gear ratio design allows the reactor to function at the speed ratio of infinity when the first drive shaft 12 is rotating and the second drive shaft 14 is stationary.

As will now be apparent to a person of ordinary skill in the art, when the first drive shaft 12 is stationary, the third gears as in 32 and the sixth gear 40 are stationary. If the second drive shaft 14 rotates while the first drive shaft 12 is stationary, the fifth gears 42 roll along the pitch surface of the stationary outer gear 40, and the fourth gears as in 34 rotate relative to a pitch surface of an imagined ring gear X formed by the stationary assembly of the third gears as in 32.

Still referring to FIG. 1, as each of the fourth gears as in 34 rotates with a respective one of the fifth gears 42, the gears necessarily rotate at the same angular speed about their shared axis. To allow them rotate at the same speed and thus allow the two drive shafts to rotate at any speed ratio, their pitch diameters need to be appropriately designed.

Figure 6A:
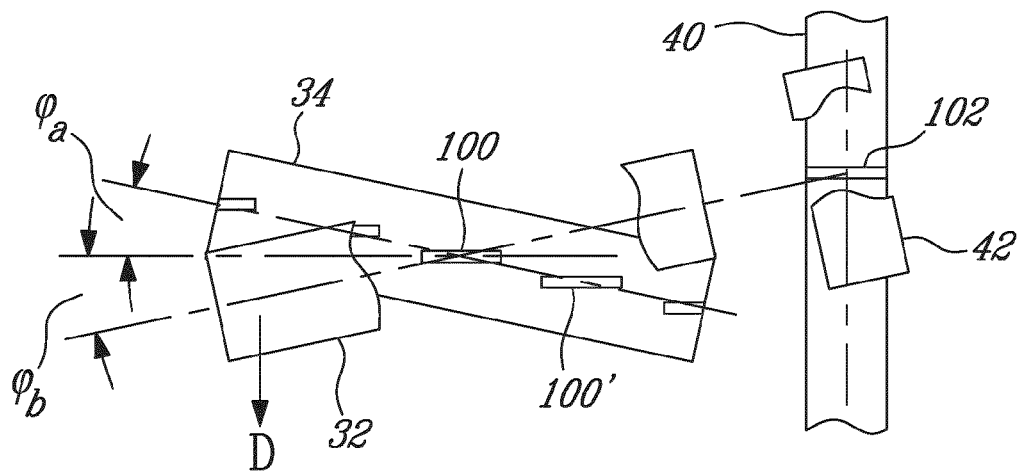
FIGS. 6A and 6B provide detailed diagrams of the interaction of two planetary gearsets in accordance with an illustrative embodiment of the present invention.

Referring now to FIG. 6A in addition to FIG. 1, as the fourth gears as in 34 rotates about the first drive shaft 12 and within the third gears as in 32, the teeth as in 100 of a given one of the fourth gears as in 34 mesh with the teeth (not shown) of the third gears as in 32. Of note is that for clarity only a portion of each tooth as in 100 is shown. A person of ordinary skill in the art will understand that in the present illustrated embodiment the entire tooth 100 extends helically along the third gear 32 and generally in parallel to the first drive shaft 12. Similarly the teeth 102 of the sixth gear 40 mesh with the teeth (also not shown) of the fifth gears as in 42.

In an illustrative embodiment, and in order to maintain the appropriate gear ratios, the number of teeth as in 100 on each of the third gears as in 32 and the fourth gears as in 34 are matched to ensure that when a given one of the fourth gears as in 34 is in the position shown relative to a given one of the third gears as in 32, a tooth (not shown) of the third gear 32 meshes with a tooth as in 100 of the fourth gear 34 while a tooth (not shown) of the fifth gear 42 meshes with a tooth 102 of the sixth gear 40.

Figure 6B:
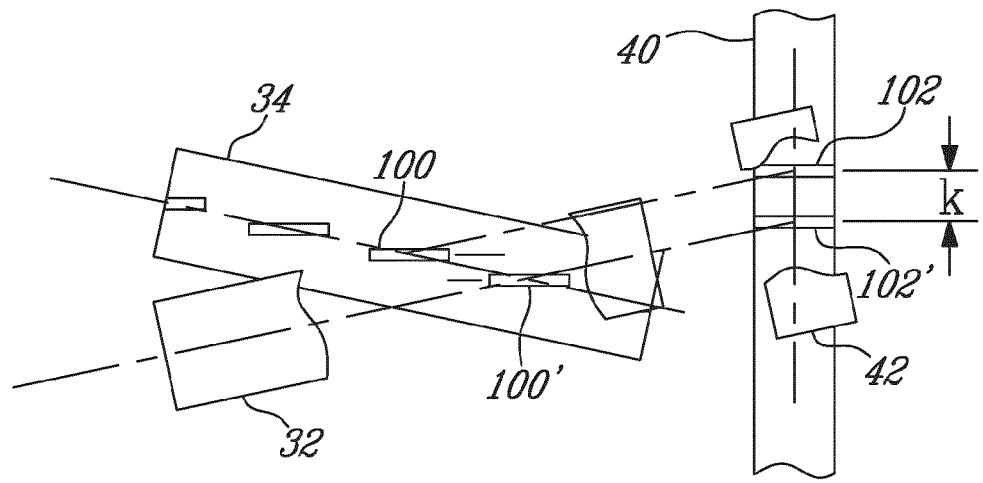

As the contact zone between the third gear 32 and the fourth gear 34 moves to the position as shown in FIG. 6B and meshes with adjacent tooth 100', fifth gear 42 also moves and meshes with tooth 102' sixth on gear 40. Assuming that the third gear 32 and fifth gear 42 have the same number of teeth, then tooth 102' is also adjacent tooth 102.

In case the case at hand, apparent angle $\phi_a$ is equal to $\phi_b$ and the distance 'k' between two adjacent teeth 74 on the outer gear is twice the distance T between two adjacent teeth 100 and 100'. As a result, the circular pitch of each of the fifth gears as in 42 is twice the circular pitch of each of the fourth gears as in 34, that is, the pitch diameter of each of the fifth gears as in 42 is twice that of each of the fourth gears as in 34. This difference in the pitch diameters of each of the fourth gears as in 34 and each of the fifth gears as in 42 results in an ability in generating a torque that is applied on the second carrier 38 and the second drive shaft 14, resulting in an output torque of the transmission.

The diagrams in FIGS. 7A through 7G illustrate the manner in which the velocities V of the contact-points vary in relation to the speed ratio. To simplify the explanation, assume that the helix-cuts of the first and second planetary gearsets 18, 20 are parallel to the central axis.

When the second drive shaft 14 is stationary, the axis of one of the second plurality of auxiliary shafts 36 is also stationary and the speed ratio S12/14 is infinite. Referring to the FIG. 7A, at first planetary gearset 18, the vector V32, perpendicular to the axis of one of the first plurality of auxiliary shafts 26, represents the velocity of the contact-point P18A on one of the third gears 32 and the vector V34, perpendicular to the axis of one of the second plurality of auxiliary shafts 36, represents the velocity of the contact-point P18B on one of the fourth gears 34. The dashed line S18 connecting the tips of the two vectors is parallel to the central axis as well as the helix cut. It represents the sliding speed between the two gears.

Similarly, at the second planetary gearset 20, vector V40, perpendicular to the central axis, represents the velocity of the contact-point P20A on the sixth gear 40 and vector V42, perpendicular to the axis of the auxiliary shaft 36, represents the velocity of the contact-point P20B on one of the fifth gears 42. The dashed line S20, parallel to the helix cut of the sixth gear 40 and the fifth gears 42, represents the sliding speed between the two gears. Since the fifth gear 42 connects to the fourth gear 34, the two gears rotate about the axis of their shared auxiliary shaft 36 at the same angular velocity w. Since the pitch diameter of the fifth gears as in 42 is twice that of the third gears as in 34, the magnitude of vector V42 is twice the magnitude of vector V34.

When the second drive shaft 14 rotates, the fourth gears 34 and the fifth gears 42 have two movements: rotation on the axis of their shared auxiliary shaft 36 and rotation about the central axis of the assembly. This modifies the angular velocity w of the gears about their own axis and thus modifies the magnitudes and directions of the velocities of the contact-points P18B and P20B. Consequently, the velocities of the contact-points P18B and P20B become the instantaneous velocities and their magnitudes and directions vary in relation to the speed of the second drive shaft 14, thereby they rely on the speed ratio as well.

Referring to FIG. 7B, the vector V36 represents the velocity of a point staying on the axis of the auxiliary shaft 36. At the first planetary gearset 18, as the auxiliary shafts as in 36 rotate about the central axis, the contact-points P18B move parallel to the axis of the first auxiliary shaft 26. Vector VP18 represents the instantaneous velocity of this movement. To simplify the explanation, assume that the sixth gear 40 is large and the gear ratio G20 is high.

As illustrated, as the contact-point P18B moves from the initial point to the end point of the vector VP18, the contact point on the auxiliary shaft 36 moves from the point P' to the end point of the vector VP18. This means the magnitude of the vector VP18 is defined by the apparent angles $\phi_a$ and $\phi_b$. Since $\phi_a$ is equal to $\phi_b$, the magnitude of the vector VP18 on the Y axis (VP18Y) is always equal to ½ the magnitude of the vector V36.

Referring to FIG. 7C, at the second planetary gearset 20, the instantaneous velocity of the contact-point P20B on fifth gear 42 is represented by the vector V42'. The vector V42' is the sum of two vectors: VP20 and V42. The vector VP20 is the result of the rotation of the fifth gear 42 about the central axis. The vector V42 is the result of the angular velocity. At the first planetary gearset 18, the instantaneous velocity of the contact-point P4B, V42', is the sum of two vectors: V42 and VP18. The vector V42 is the result of the angular velocity ω and its magnitude is always equal to ½ the magnitude of the vector V42. As can be seen from FIG. 6C, the magnitudes of the vectors V34 and V42 are reduced. The dashed line connecting the tips of the two vectors V40 and V42' is parallel to the helix cut and the dashed line connecting the tips of the two vectors V32 and V34' is also parallel to the helix cut.

While the contact-point P18B moves parallel to the axis of the auxiliary shaft 26, the contact-point P18A also moves parallel to the moving axis of the auxiliary shaft 36. The dashed line connecting the two vectors V32 and V34' is divided into two parts: the first one, designated S18, from the tip of the vector V32 to point 'Q' is the sliding speed between the gears; the second one, designated R, from point 'Q' to the tip of the vector V34' and having the same magnitude as the vector VP18X, is the result of the rotation of the fourth gear 34 on the third gear 32. Removing the rotating part R, the instantaneous velocity of the contact-point P18B can be illustrated as shown in FIG. 7D. Here, the instantaneous velocity V34' of the contact-point P18B is the sum of two vectors: VP18Y and V34; the dashed line S18 connecting the tips of the two vectors V40 and V42' is the sliding speed between the gears.

Figure 7F:
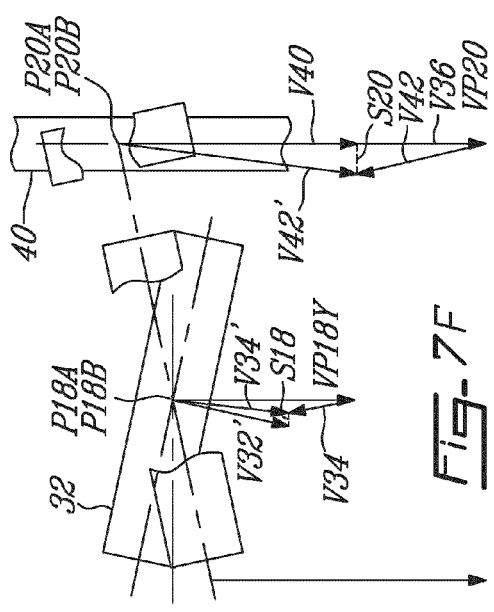
Figure 7H:
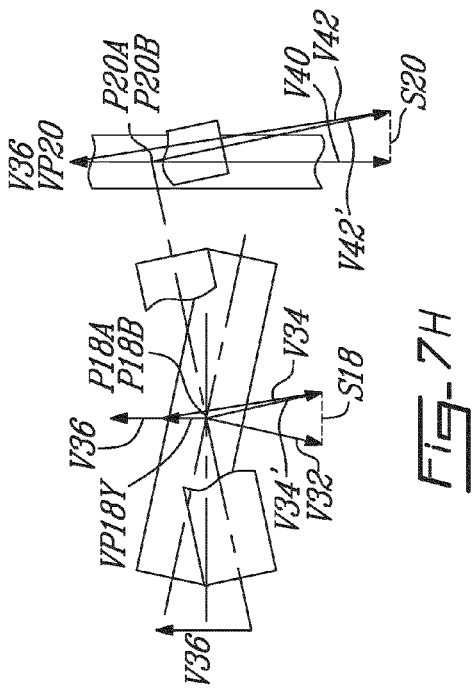
Figure 7E:
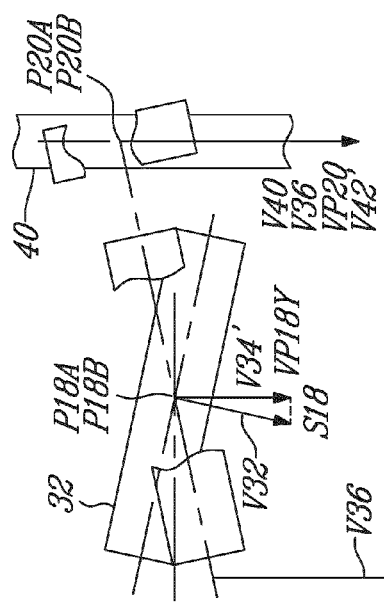

Referring now to FIG. 7E, when the speed ratio S12/14 is 1:1, the second planetary gearset 20 rotates about the central axis at the same speed as the second drive shaft 14. The angular velocity ω as well as the velocity V42 is zero and the vectors V36, VP20 and V42 are coincident (assuming that the sixth gear 40 is very large and the gear ratio G5 is very high). At the first planetary gearset 18, as the angular velocity w is zero, the velocity V34 is zero and the vector V34' is coincident to the vector VP18Y.

Referring to FIG. 7F, as the two drive shafts 12, 14 rotate with a speed ratio lower than 1:1, the angular velocity ω and the velocities V34 and V42 change to the opposite direction. As seen, as the speed ratio S12/14 becomes lower, the sliding speed S18 at the first planetary gearset 18 is decreasing. When S12/14 is around 0.5, the sliding speed S18 is substantially zero.

Figure 7G:
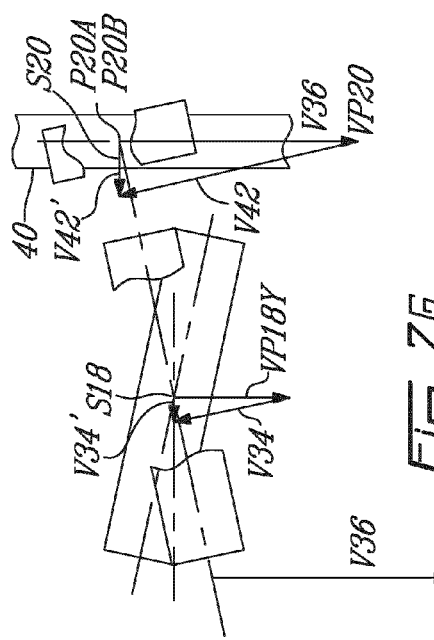

FIGS. 7G and 7H show the velocities of the contact-points when the speed ratio S12/14 is zero and when the two shafts rotate in opposite directions.

As seen in all the FIGS. 7A through 7H, the magnitude of the vector VP18Y is equal to ½ the magnitude of the vector VP20 and the magnitude of the vector V34 is equal to ½ the magnitude of the vector V42. Consequently, all the dashed lines are parallel to the helix cuts, resulting in the two drive shafts 12, 14 being able to rotate at any speed ratio.

Operation

Referring back to FIG. 1 and FIGS. 5A and 5B, the activator is inactive when no hydraulic pressure is applied to the hydraulic cylinder assemblies as in 50. The P-IVT 10 functions in neutral/idle mode and, assuming the first drive shaft is functioning as the input, no torque is applied to the second drive shaft 14.

When the activator applies hydraulic pressure to the hydraulic cylinder assemblies as in 50, the hydraulic cylinders extend or retract depending on the function of the switching valve 48. As mentioned above, each hydraulic cylinder assembly 50 has one end mounted on the first gear 22 and the other end mounted on an arm 54 that is splined to first drive shaft 12. As the hydraulic cylinder assemblies 50 are extended or retracted, they rotate the first gear 22 relative to the first drive shaft 12.

As mentioned above, the gear ratios and the dimensions of the gearsets are designed so that the drive shafts 12, 14 can rotate at any speed ratio when coupling the first gear 22 to the first drive shaft 12. This also means that the first gear 22 and the first drive shaft 12 rotate at the same speed no matter what the speed ratio between the two drive shafts 12, 14 is. When the first drive shaft 12 turns one revolution, for example, the first gear 22 also turns one revolution (ignoring any backlash caused by the teeth clearances and play in the gear-sets).

As hydraulic pressure is applied to the hydraulic cylinder assemblies 50, the hydraulic cylinder assemblies 50 will attempt to rotate the first gear 22 relative to the first drive shaft 12 through a small angle (typically less than 2°), due to backlash. As the backlash is eliminated, the hydraulic cylinder assemblies 50 are no longer able to rotate the first gear 22 versus the first drive shaft 12. However, as hydraulic pressure is still being applied on the hydraulic cylinder assemblies 50, the hydraulic cylinders generate two equal and opposite torques: one applied on the first gear, referred to hereinafter as M_22_H, and the other applied to the first drive shaft 12, referred to hereinafter as M_12_H. The strength and directions of the torques M_22_H and M_12_H can be controlled through the pressure control unit 46 and the switching valve 48.

Figure 8:
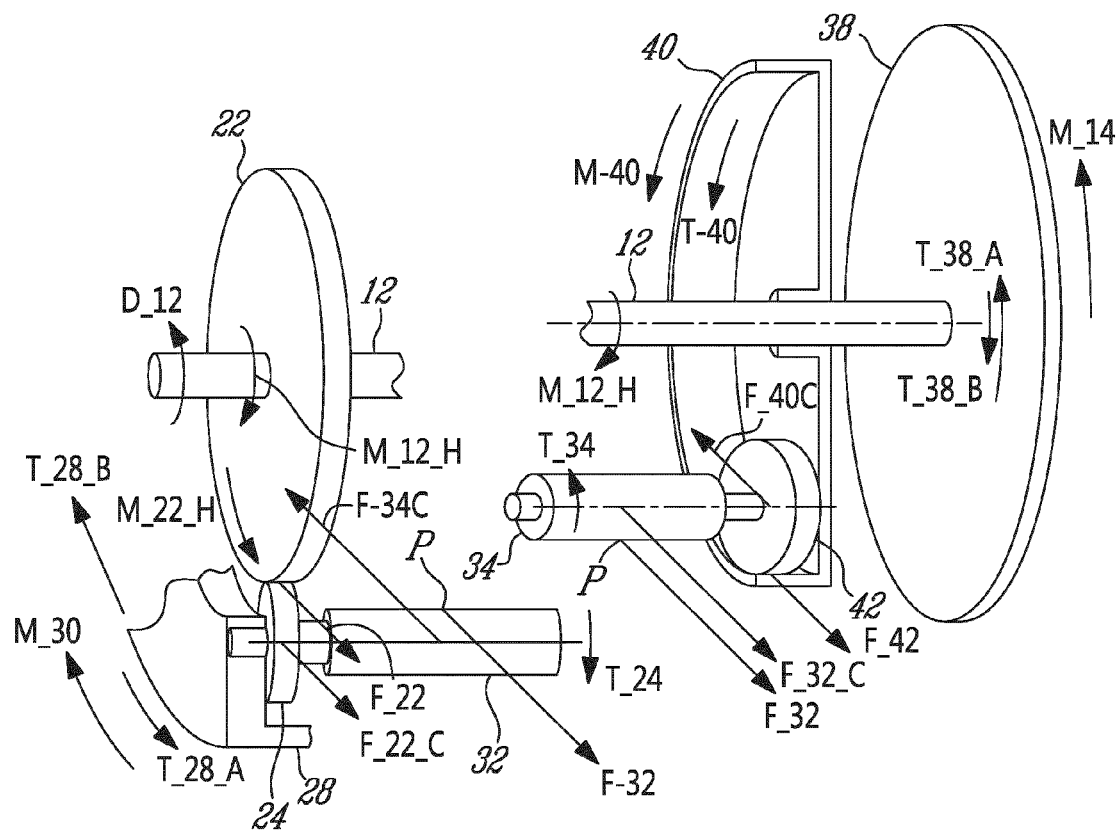
FIG. 8 provides a partially cut away and exploded perspective view of a reactor forces and torques on components of a reactor in accordance with an illustrative embodiment of the present invention.

Referring now to FIG. 8, forces and torques in the reactor when the speed ratio between the two shafts is infinity with the first drive shaft 12 rotating and the second drive shaft 14 stationary is shown. When the second drive shaft 14 is stationary, the second carrier 38 is stationary and the fourth gears as in 34 and the plurality of fifth gears 42 rotate on their stationary axes (i.e. they are not rotating about the central axis and engage with the third gears as in 32 only. As mentioned, the helix cuts of the third gears as in 32 and the fourth gears as in 34 are parallel to the central axis therefore the forces F_32, F_32C and F_34C lie in a plane that is perpendicular to the central axis.

Still referring to FIG. 8, the arrow D_12 indicates the rotating direction of the first drive shaft 12. At the fixed gearset 16, as torque M_22_H is applied on the first gear 22, and results in the forces F_22 on each of the plurality of second gears 24. As a force F_22 is applied on each of the plurality of second gears 24, it results in a torque T_24 and a force F_22_C on the center of each of the plurality of second gears 24. Since each of the plurality of second gears 24 is supported on the first carrier 28, the force F_22_C generates a torque T_28_A on the first carrier 28. Since each of the plurality of second gears 24 connects to a respective one of the first plurality of gears 32, torque T_24 is applied to each of the third gears 32. At the first planetary gearset 18, torque T_24 results in two opposite and equal forces: force F_32 and force F_34_C. Force F_32 is applied to each of the fourth gears 34 and results in a torque T_34 and a force F_32_C at the center of each of the fourth gears 34. As each of the fourth gears 34 is supported on the second carrier 38, force F_32_C generates a torque T_38_A on the second carrier 38. Each of the fifth gears 42 is interconnected with a respective one of the fifth gears 42 and as a result, generated torque T_34 is applied to each of the fifth gears 42. At the second planetary gearset 20, generated torque T_34 results in two opposite and equal forces, F_42 and force F_40_C. Force F42 is applied to the outer gear 40. Force F_40_C is applied at the center of each of the plurality of inner gears 42. Since each of the fifth gears 42 is supported on the second carrier 38, force F_40_C generates a torque T_38_B on the second carrier 38 in a direction opposite to that of the torque T_38_A.

As the pitch diameter of each of the fifth gears 42 is twice as large as that of each of the fourth gears as in 34, the strength of force F_32_C is twice the force F_40_C:

$$F\_32\_C = 2 \times F\_40\_C \quad (5)$$

$$T\_38\_A = 2 \times T\_38\_B \quad (6)$$

Assuming that the first drive shaft 12 is being driven by an input and the second drive shaft 14 is connected to an output, as the second carrier 38 is secured to the second drive shaft 14, the strength of the driving torque M_14 on the second drive shaft 14 is the sum of all the differences between the torques T_38_A and T_38_B:

$$M\_14 = \Sigma(T\_38\_A - T\_38\_B) \quad (7)$$

$$M\_14 = -\Sigma T\_38\_B \quad (8)$$

As the gear ratio G_16 as well as the gear ratio G_20 is very high, the driving torque M_14 can be defined according to the following equation:

$$M\_14 = M\_22\_H \quad (9)$$

The strength and direction of the driving torque M_14 can be controlled through the pressure control unit 46 and the switching valve 48 i.e. an increase or decrease in the hydraulic pressure will increase or decrease the driving torque and switching the inlet port at the hydraulic cylinders 50 will change the direction of the driving torque. When the hydraulic pressure is zero, the transmission functions in neutral/idle mode.

Still referring to FIG. 8, force F_42 is applied on the sixth gear 40 and results in a torque T_40 on the sixth gear 40. All the torques T_40 forms a torque M_40 opposite to torque M_12_H that is formed by the hydraulic cylinder.

The resistance M_12 on the first drive shaft 12 is:

$$M\_12 = M\_\mathbf{12}\_H - M\_40 \quad (10)$$

As the gear ratio of the first planetary gearset 18 is 1:1 and the gear ratio of the fixed gearset 16 is equal to the gear ratio of the second planetary gearset 20:

$$M\_40 = M\_\mathbf{12}\_H \quad (11)$$

$$M\_12 = 0 \quad (12)$$

The forces F_22_C and F_34_C form two opposite torques T_28_A and T_28_B on the first carrier 28 that is fixed on the transmission case 30. The torque M_30 on the transmission case is the sum of all the differences between the torques:

$$M\_30 = \Sigma(T\_28\_B - T\_28\_A) \quad (13)$$

By conservation law:

$$M\_30 = -M\_22\_H \quad (14)$$

When the second drive shaft 14 is stationary, the first planetary gearset 18 functions as a fixed gearset. Other than frictional losses, power from the first drive shaft 12 is transferred via the three gearsets 16, 18, 20 back to the first drive shaft 12. As a result, the reactor performs the torques applying on the drive shafts and the transmission case as described. When the second drive shaft 14 rotates, a portion of the power is transferred power from the first drive shaft 12 to the second drive shaft 14. This reduces the power transferred back to the first drive shaft 12, creating a countering resistance on the first drive shaft 12, and as a result varying the torque on the transmission case 30.

As discussed above, the third gears as in 32 together form a ring gear, referred to as the imaginary gear X. Referring to FIG. 7B, when both drive shafts rotate, the contact-point P18B moves parallel to the axis of the first auxiliary shaft 26. The movements of the contact points cause the fourth gears as in 34 to engage with the imaginary gear X. Engagement of the fourth gears as in 34 and the imaginary gear X causes an additional force to be applied at the contact point in a direction that is parallel to the axis of the first auxiliary shaft 26. When both drive shafts rotate, the fourth gears as in 34 have two functions: engagement with the third gears as in 32 and engagement with the imaginary gear X. Consequently, force F_32 is the sum of two forces: a first force resulting from the engagement of the third gears as in 32 and the fourth gears as in 34 (as mentioned, this force lies in a plane that is perpendicular to the central axis); and a second force resulting from the engagement of the fourth gears as in 34 and the imaginary gear X and lying in a plane that is parallel to the axis of the first auxiliary shaft 26. the direction of force F_32 is related to the rate between the two forces and therefore it is related to the speed ratio between the two drive shafts. As the speed ratio varies from infinity(the first drive shaft rotates and the second drive shaft remains stationary) to zero (the second drive shaft rotates and the first drive shaft remains stationary), force F_32 is in a direction that rotates from being initially parallel to a line that is perpendicular to the central axis to ultimately being parallel to the axis of the first auxiliary shaft 26.

Referring to FIG. 2 and FIG. 8, the axis of each of the third gears as in 32 forms an angle $\phi_c$ with each of the axis of the fourth gears as in 34, referred to as the crossed-angle. Consequently, the axis of torque T_24 forms the crossed angle $\phi_c$ with the axis of torque T_34. As the speed ratio varies, the direction of force F_32 changes; the ratios between the torques T_24 and T_34 varies. Similarly, the axis of torque T_34 forms the crossed-angle $\phi_a$ with the axis of the torques T_28B and T_38A. As the speed ratio varies, the directions of the forces F_32C and F_34C change and the ratio between the torques T_24 and T_28B varies as well as the ratio between the torques T_24 and T_38A.

When the speed ratio between the two drive shafts varies, the ratios between torque T_24 and T_34, between T_24 and T_28B and between T_24 and T_38A vary. Consequently, the strength of the torques T_34, T_28B and T_38A vary. Referring to FIG. 8, as torque T_34 is applied to the fifth gear as in 42 a resultant torque T_40 is applied to the sixth gear 40 that connects to the first drive shaft 12. Torque T_28B is applied to the first carrier 28 that is fixed on the transmission case 30. Torque T_38 A is applied to the second carrier 38 connected to the second drive shaft 14. In this manner, the first planetary gearset 18 varies the torque on the two drive shafts 12, 14 and on the transmission case 30 in response to the variation of the speed ratio.

Alternative Configurations

With reference to back FIG. 2, as discussed above the axes of the shafts 26 and 36 form an angle $\phi_c$ to each other. They also form the angles $\phi_a$ and $\phi_b$ with respect to the central axis. The angle $\phi_c$ is the largest angle. The reactor may have other configurations by modifying the angles $\phi_a$ and $\phi_b$.

For the applications where the smooth and quiet engagement is not a critical demand, both angles $\phi_a$ and $\phi_b$ can be zero. Also, the gear-sets 16, 18 and 20 can be one of the common types of gears such as pure gears, helical gears or bevel gears.

With reference to back FIG. 1, the sixth gear 40 is shown as an internal ring gear and the first gear 22 is an external gear. The reactor may have other configurations by changing the gear types of the first gear 22 and the sixth gear 40. For example the first gear 22 can be an internal ring gear and sixth gear 40 can be an external gear. Certain designs may have both gears are external gear or internal ring gear.

Referring back to FIG. 2, the shafts 26, 36 may be positioned horizontally with the axes of the shafts 26, 36 parallel to the central axis. The reactor may have other configurations by modifying the positions of shafts 26, 36.

Referring now to FIG. 9A and FIG. 9B, an alternative configuration is provided. The shafts 26 and 36 are posed radially. In this embodiment, the third gears as in 32 and the fourth gears as in 34 are conic gears and the fixed gearset 16 and the second planetary gearset 20 comprise Hypoid Gears, another type of Non-intersecting and Nonparallel Gear.

With reference to FIG. 9A, the axes of the shafts 26, 36 intersect the central axis. The reactor may have other configurations by modifying the angles formed by the axes of the shafts 26, 36 with the central axis.

Alternative Reactor Designs

Figure 10:
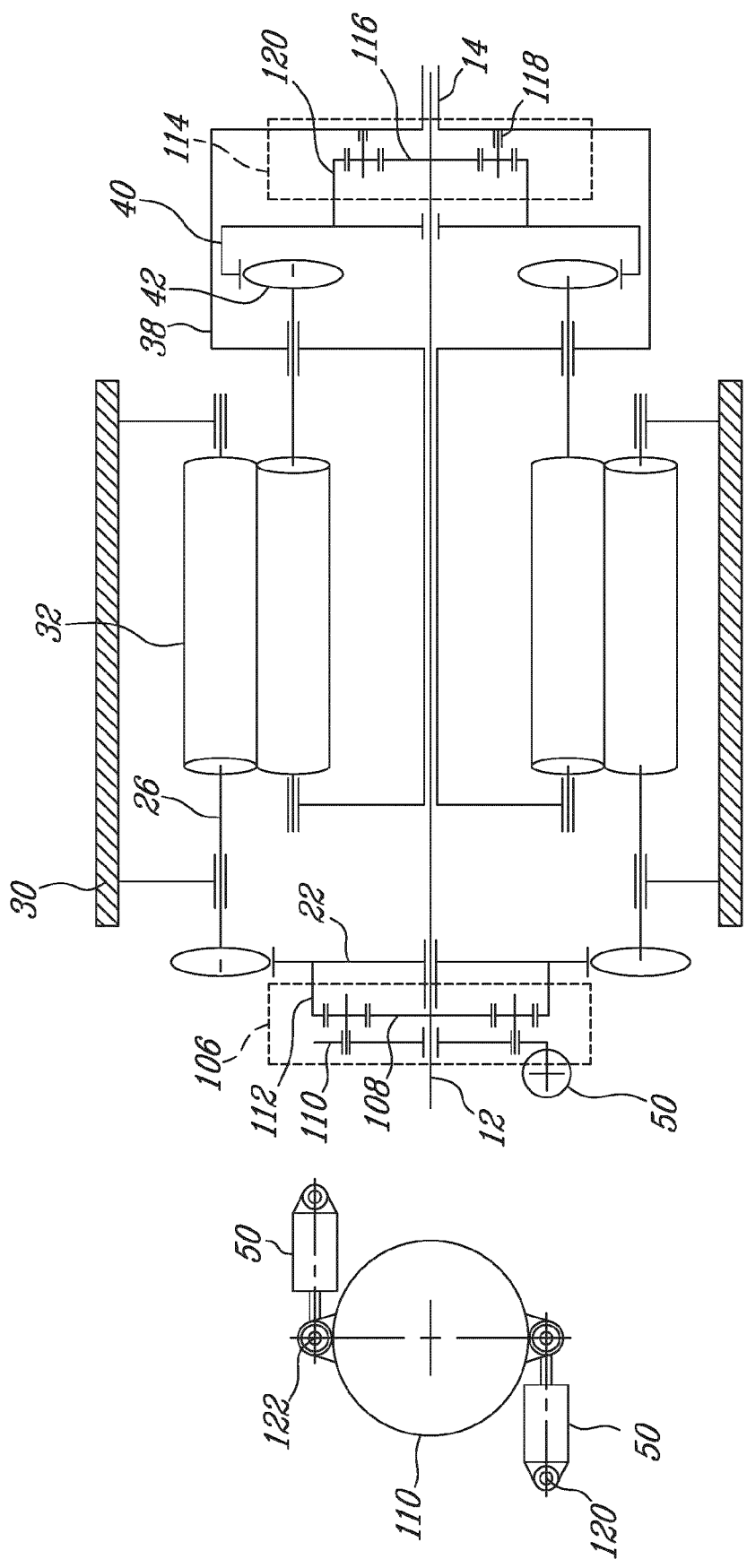
FIG. 10 provides a side plan/schematic view of a reactor in accordance with an alternative design in accordance with an illustrative embodiment of the present invention.

Referring now to FIG. 10, a first alternative reactor is provided. The reactor has an additional planetary gearset and/or a planetary gearset added to improve the rigidity of the reactor, provide more options in design related to the angles $\phi_a$ and $\phi_b$, and the sizes and helix cuts of the planetary gearsets 16 and 20.

Still referring to FIG. 10, a third planetary gear set 106 comprises three driving members: a sun gear 108, a carrier 110 and a ring gear 112. The sun gear 108 is splined to the first drive shaft 1. The carrier 110 is mounted freely on the first drive shaft 12. The ring gear 112 connects to the first gear 22. In this embodiment, the first gear 22 is mounted freely on the first drive shaft 12. A fourth planetary gear set 114 comprises three driving members: a sun gear 116, a carrier 118 and a ring gear 120. The sun gear 116 is splined to the first drive shaft 12 and revolves therewith. The ring gear 120 connects to the sixth gear 40. Sixth gear 40 is mounted freely on the first drive shaft 12. The carrier 118 connects to the first carrier 26 and the second drive shaft 14.

Still referring to FIG. 10, as discussed above the gear ratio of the first planetary gear-set 18 is equal to 1:1. The numbers of teeth of the sixth gear 40, the fifth gears as in 42, the sun gear 116 and ring gear 118 are determined so that the second drive shaft 14 revolves when the first drive shaft 12 is stationary. The numbers of teeth of the first 22, the second gears 24, the sun gear 108 and ring gear 112 are determined so that the gear ratio between the first drive shaft 12 to the third gears 32 is equal to the gear ratio between the first drive shaft 12 and the fourth gears 34.

Still referring to FIG. 10, each hydraulic cylinder assembly as in 50 has one end mounted on the transmission case 30 by a first pivot 120 and another end mounted on the carrier 110 by a second pivot 122.

Still referring to FIG. 10, of note is that the third 106 and fourth 114 planetary gearsets can be applied equally to the first drive shaft 12 and the second drive shaft 14 of the alternative reactor configuration as depicted in FIGS. 9A and 9B.

Figure 11:
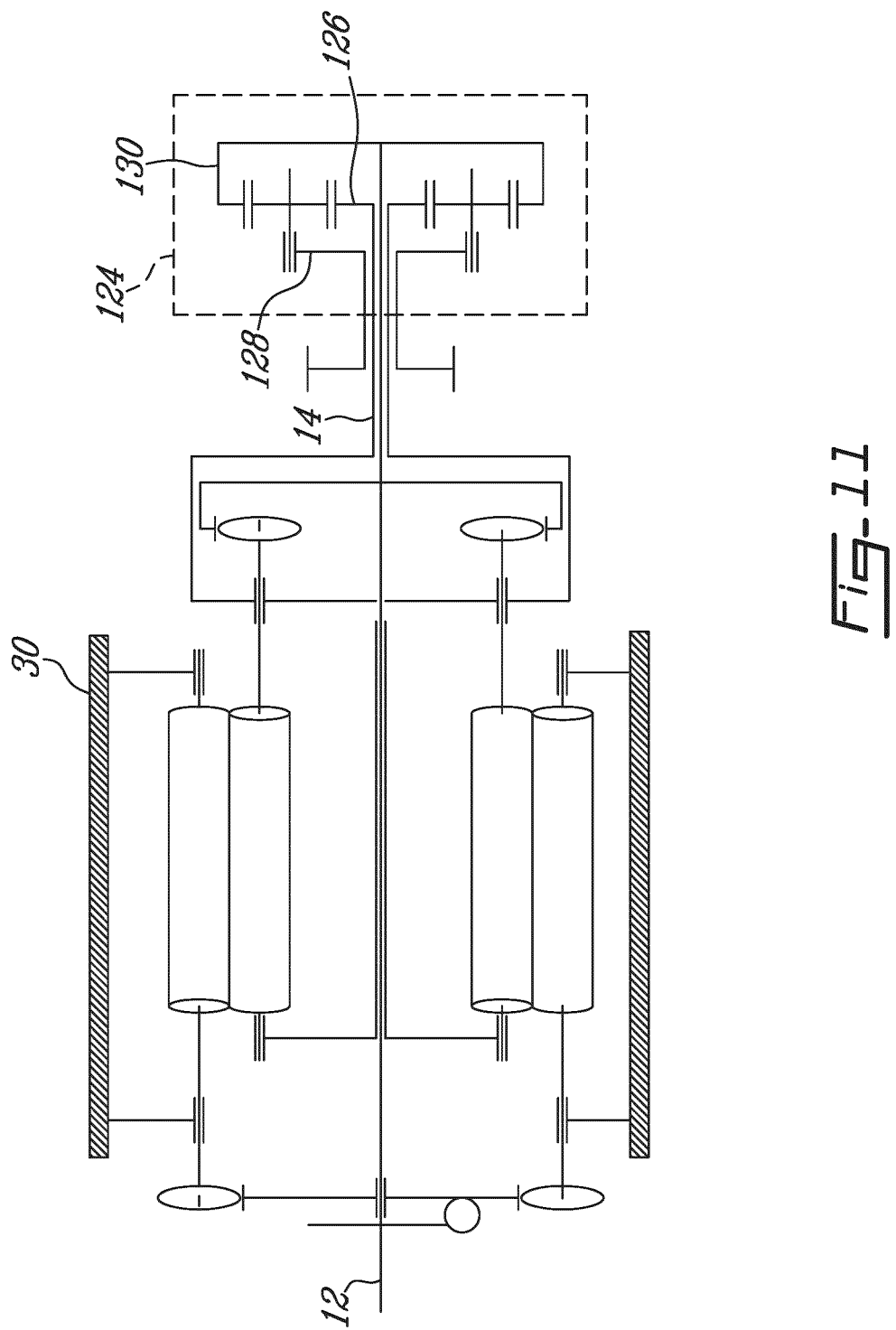
FIG. 11 provides a side plan/schematic view of a reactor in accordance with a second alternative illustrative embodiment of the present invention.

Referring now to FIG. 11, in a second alternative embodiment a fifth planetary gearset 124 is added to the reactor. The planetary fifth planetary gearset 124 comprises three driving members: a sun gear 126, a carrier 128 and a ring gear 130. The sun gear 126 is splined to the second drive shaft 14. The ring gear 130 connects to first drive shaft 12. The carrier 128 provides the output of the transmission, and would be connected, for example, to a differential through a gearset or a chain assembly.

Figure 12:
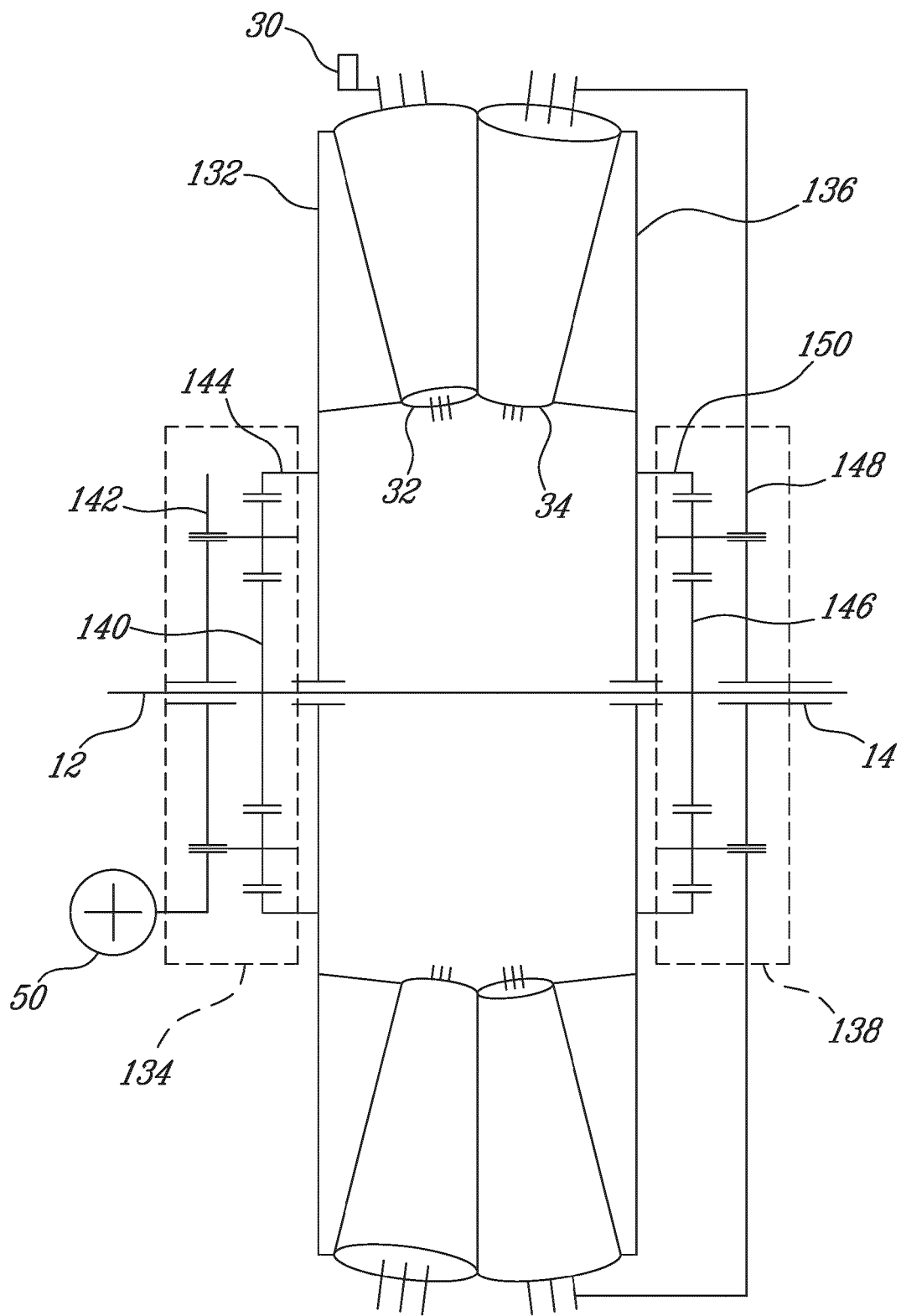
FIG. 12 provides a side plan/schematic view of a reactor in accordance with a third alternative illustrative embodiment of the present invention.

Referring now to FIG. 12 in addition to FIG. 1, in a third alternative embodiment, a first bevel gear 132 and planetary gear set 134 replace the fixed gear set 16. Similarly, a second bevel gear 136 and planetary gear set 138 replace the second planetary gear-set 20. The first bevel gear 132 is mounted to rotate freely about the first drive shaft 12 and also meshes with the plurality of third gears 32. The planetary gear set 134 comprises three driving members: a sun gear 140, a carrier 142 and a ring gear 144. The sun gear 140 is splined to the first drive shaft 12. The ring gear 144 is connected to the first bevel gear 132. The carrier 142 is mounted to rotate freely about the first drive shaft 12 and is interconnected with the transmission case 30 through the hydraulic cylinders as in 50.

As discussed above, the second bevel gear 136 and planetary gear set 138 replace the second planetary gear-set 20. The planetary gear set 138 comprises three driving members: a sun gear 146, a carrier 148 and a ring gear 150. The sun gear 146 is splined to the first drive shaft 12. The ring gear 150 is connected to the second bevel gear 136. The carrier 148 is interconnected to the second drive shaft 12.

Illustratively, the gear ratio of the first planetary gearset 18 is 1:1. The numbers of teeth of the bevel gears 132, 136 are related to the sizes and helix angles of the plurality of third gears 32 and forth gears 34. The number of teeth of the sun gear 146 and ring gear 148 are determined so that the second drive shaft 14 revolves when the first drive shaft 14 is stationary. The numbers of teeth of the sun gear 140 and ring gear 142 are determined such that the gear ratio from the first drive shaft 12 to the third gears gear 32 is equal to the gear ratio from the first drive shaft 12 to the fourth gears 34.

Referring back to the diagrams of FIGS. 7A through 7H, when the speed ratio S1/2 between the first and second shafts 12, 14 is 1:1, the planetary gearset 20 moves as a unit and functions without losing energy. When the speed ratio S1/2 is 0.5, the sliding speed S18 between gears 32 and 34 is zero. To improve the efficiency and to prolong the life time of the gearset 18, the reactor should function at the speed ratio between 1:1 and 0.5. Where the first (input) shaft 12 is connected directly to a source of motive energy such as an engine and the carrier 128 provides the output of the transmission, and would be connected to a differential with a final gear, for example 2.5:1.

It is known that there have various types of planetary gear sets based on the gears arrangement. The reactor may have other configurations by applying different types of planetary gear sets, for example. Applying different type planetary gear sets may alter the connection among their three rotary members. Changing the gear types of gear the first gear 22 and the sixth gear 40 may also alter the connection among their three rotary members. The essential issues provided by the third and fourth planetary gear sets 104, 114 are the suitable gear ratios that permit the reactors to function at any speed ratio.

While this invention has been described with reference to the illustrative embodiments, this description is not intended to be construed to a limiting sense. Various modifications or combinations of the illustrative embodiment of the invention will be apparent to persons skilled in the art upon reference to the description. It is therefore intended that the described invention encompass any such modifications or embodiments.

The invention claimed is:

1. A positive infinitely variable transmission comprising:
a first driveshaft;
a second driveshaft;
a first gear rotating about a central axis and secured to said first driveshaft for rotation therewith;
a plurality of fixed second gears equally spaced about said central axis and in meshing contact with said first gear;
a plurality of fixed third gears spaced regularly about said central axis, wherein each of said plurality of third gears rotates with a respective one of said plurality of fixed second gears;
a plurality of fourth gears each mounted on a rotatable carrier and spaced regularly about said central axis, said carrier rotatable about said central axis, wherein said second driveshaft rotates with said rotatable carrier and further wherein said plurality of third gears is in meshing contact with said plurality of fourth gears;
a plurality of fifth gears equally spaced about said central axis, each of said fifth gears rotating with a respective one of said plurality of fourth gears;
a sixth gear rotating about said central axis and controllably secured to said first driveshaft for rotation therewith, said sixth gear in meshing contact with each of said fifth gears; and
an actuator for controllably adjusting an angle of rotation at which said sixth gear is attached to said first drive shaft, thereby enabling the transfer of a series of torques through all the gears.

2. The positive infinitely variable transmission of claim 1, wherein said actuator comprises a hydraulic piston assembly, one end of said hydraulic piston assembly attached to said drive shaft and a second end attached to said sixth gear, wherein extension of said piston rotates said sixth gear relative to said first drive shaft in a first direction.

3. The positive infinitely variable transmission of claim 2, wherein retraction of said piston rotates said sixth gear relative to said first drive shaft in a direction opposite to said first direction.

4. The positive infinitely variable transmission of claim 1, wherein each of said plurality of fixed third gears and said respective one of said fixed second gears are mounted to one of a first plurality of auxiliary shafts.

5. The positive infinitely variable transmission of claim 4, wherein each of said first plurality of auxiliary shafts are mounted on a fixed carrier.

6. The positive infinitely variable transmission of claim 1, wherein said sixth gear is a ring gear and said plurality of fifth gears are spaced evenly about an inside of said ring gear.

7. The positive infinitely variable transmission of claim 4, further comprising a casing and further wherein said first plurality of auxiliary shafts are secured to said casing.

8. A planetary gearset comprising:
- a first plurality of gears each mounted on a respective one of a first plurality of auxiliary shafts supported by a first carrier and spaced regularly about a central axis; and
- a second plurality of gears each mounted on a respective one of a second plurality of auxiliary shafts supported by a second carrier and spaced regularly about said central axis, said second carrier rotatable about said central axis;
- wherein said second plurality of gears mesh with and rotate within said first plurality of gears, said first plurality of gears thereby functioning as a ring gear and said second plurality of gears functioning as planetary gears.

9. The planetary gearset of claim 8, wherein said first and second plurality of gears are substantially cylindrical and said first and second pluralities of auxiliary shafts are arranged primarily along said central axis.

10. The planetary gearset of claim 8, wherein said first and second plurality of gears are hyperboloid.

11. The planetary gearset of claim 8, wherein said first and second plurality of gears are substantially conical and said first and second pluralities of auxiliary shafts are arranged primarily radially outward to said central axis.

12. The planetary gearset of claim 8, wherein said first plurality of auxiliary shafts and said second plurality of auxiliary shafts are driven by an input drive shaft and said second carrier is coupled to an output drive shaft and further comprising a torque generating actuator interconnected between said input drive shaft and said second plurality of auxiliary shafts, said actuator enabling the transfer of a series of torques through all the gears.

13. The planetary gearset of claim 8, wherein said first carrier is stationary.

* * * * *